(12) United States Patent
Kwon et al.

(10) Patent No.: US 11,496,900 B2
(45) Date of Patent: Nov. 8, 2022

(54) ELECTRONIC DEVICE AND METHOD FOR STORING USER IDENTIFICATION INFORMATION

(71) Applicant: Samsung Electronics Co., Ltd., Suwon-si (KR)

(72) Inventors: Eunyoung Kwon, Suwon-si (KR); Gawon Lee, Suwon-si (KR); Dasom Lee, Suwon-si (KR); Taeckki Lee, Suwon-si (KR); Daehaeng Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 16/801,870

(22) Filed: Feb. 26, 2020

(65) Prior Publication Data

US 2020/0275274 A1 Aug. 27, 2020

(30) Foreign Application Priority Data

Feb. 26, 2019 (KR) .......................... 10-2019-0022418

(51) Int. Cl.
*H04W 12/08* (2021.01)
*H04L 9/32* (2006.01)
(Continued)

(52) U.S. Cl.
CPC ............ *H04W 12/08* (2013.01); *H04L 9/3231* (2013.01); *H04W 4/80* (2018.02); *H04W 12/041* (2021.01);
(Continued)

(58) Field of Classification Search
CPC ..... H04W 12/08; H04W 4/80; H04W 12/041; H04W 12/06; H04W 12/03;
(Continued)

(56) References Cited

U.S. PATENT DOCUMENTS

| | | | | |
|---|---|---|---|---|
| 7,805,611 | B1 * | 9/2010 | Montemayor | ........ H04L 9/3273 |
| | | | | 713/172 |
| 8,214,649 | B2 * | 7/2012 | Wood | ..................... H04L 9/3215 |
| | | | | 713/182 |

(Continued)

FOREIGN PATENT DOCUMENTS

| | | | | |
|---|---|---|---|---|
| CN | 103416082 A | * | 11/2013 | ............. H04W 12/06 |
| CN | 105488427 A | * | 4/2016 | ........... G06F 21/602 |

(Continued)

OTHER PUBLICATIONS

Ban; Credential D4.4 Guidelines for Secure Authentication to the Cloud; Ref. Ares(2018)1737757; Project No. 653454; Project start: Oct. 1, 2015; H2020-DS-2014-1; Project duration: 3 years; https://ec.europa.eu/research/participants/documents/downloadPublic?documentIds=080166e5b99d5c3c&appId=PPGMS; Mar. 29, 2018.

(Continued)

*Primary Examiner* — Shahriar Zarrineh
(74) *Attorney, Agent, or Firm* — Jefferson IP Law, LLP

(57) ABSTRACT

An electronic device is provided. The electronic device includes at least one wireless communication circuit, a processor operatively connected with the at least one wireless communication circuit, and a memory operatively connected to the processor, wherein the memory stores instructions that, when executed, cause the processor to detect an event related to transmission of identification information through the at least one wireless communication circuit, in response to the detection of the event, perform a first authentication procedure for obtaining access right to the identification information, relay a second authentication procedure between an external electronic device and a server through the at least one wireless communication circuit, and receive the identification information that is stored in the (Continued)

external electronic device from the server through the at least one wireless communication circuit.

11 Claims, 9 Drawing Sheets

(51) Int. Cl.
    *H04W 12/06*     (2021.01)
    *H04W 4/80*     (2018.01)
    *H04W 12/041*     (2021.01)

(52) U.S. Cl.
    CPC ......... *H04W 12/06* (2013.01); *H04L 2209/56* (2013.01)

(58) Field of Classification Search
    CPC ... H04W 12/068; H04W 12/47; H04W 12/48; H04W 8/205; H04W 12/043; H04L 9/3231; H04L 2209/56; H04L 2209/805; H04L 9/14; H04L 9/3226; H04L 63/0861; H04L 9/3247
    See application file for complete search history.

(56) References Cited

U.S. PATENT DOCUMENTS

| | | | | |
|---|---|---|---|---|
| 9,792,458 | B2 * | 10/2017 | Florez | G06F 21/6263 |
| 9,801,044 | B2 * | 10/2017 | Song | H04W 4/70 |
| 9,865,107 | B2 | 1/2018 | Chang et al. | |
| 10,083,555 | B2 * | 9/2018 | Woo | H04B 17/318 |
| 10,091,272 | B2 * | 10/2018 | Cho | H04L 67/12 |
| 10,129,236 | B2 * | 11/2018 | Gomi | H04L 63/08 |
| 10,164,775 | B2 * | 12/2018 | Park | H04L 9/0869 |
| 10,198,176 | B2 * | 2/2019 | Lee | G06F 3/0488 |
| 10,356,070 | B2 | 7/2019 | Cha et al. | |
| 10,425,409 | B2 * | 9/2019 | Lee | G06K 9/001 |
| 10,575,348 | B2 | 2/2020 | Meads et al. | |
| 2008/0034216 | A1 * | 2/2008 | Law | H04L 9/3273 |
| | | | | 713/168 |
| 2008/0141313 | A1 * | 6/2008 | Kato | H04L 63/0853 |
| | | | | 725/62 |
| 2011/0179473 | A1 * | 7/2011 | Lee | H04L 63/105 |
| | | | | 726/6 |
| 2013/0019109 | A1 * | 1/2013 | Kang | G06F 21/10 |
| | | | | 713/193 |
| 2013/0082819 | A1 * | 4/2013 | Cotterill | G06F 21/40 |
| | | | | 340/5.2 |
| 2014/0082056 | A1 * | 3/2014 | Gargiulo | H04W 4/50 |
| | | | | 709/203 |
| 2014/0164475 | A1 * | 6/2014 | Gargiulo | H04W 12/08 |
| | | | | 709/202 |
| 2014/0342670 | A1 * | 11/2014 | Kang | H04W 4/80 |
| | | | | 455/67.11 |
| 2015/0215311 | A1 * | 7/2015 | Rhelimi | H04W 12/06 |
| | | | | 726/6 |
| 2015/0262164 | A1 * | 9/2015 | Ranganathan | G06F 16/1865 |
| | | | | 705/39 |
| 2016/0112386 | A1 * | 4/2016 | Park | H04W 12/04 |
| | | | | 713/171 |
| 2016/0241537 | A1 | 8/2016 | Cha et al. | |
| 2016/0242033 | A1 | 8/2016 | Jung et al. | |
| 2016/0253651 | A1 * | 9/2016 | Park | G06Q 20/34 |
| | | | | 705/39 |
| 2017/0004665 | A1 | 1/2017 | Chang et al. | |
| 2017/0201886 | A1 * | 7/2017 | Yang | H04W 12/35 |
| 2017/0213211 | A1 | 7/2017 | Sibert et al. | |
| 2017/0295174 | A1 * | 10/2017 | Kim | H04L 63/0838 |
| 2018/0032712 | A1 * | 2/2018 | Oh | H04L 9/3231 |
| 2018/0098364 | A1 | 4/2018 | Meads et al. | |
| 2018/0109947 | A1 * | 4/2018 | Kim | G06F 21/34 |
| 2018/0225662 | A1 | 8/2018 | Sibert et al. | |
| 2018/0262530 | A1 * | 9/2018 | Sharifi Mehr | H04L 63/166 |

FOREIGN PATENT DOCUMENTS

| | | | | |
|---|---|---|---|---|
| CN | 107872321 A | * | 4/2018 | |
| CN | 108282466 A | * | 7/2018 | ........ H04L 63/0823 |
| CN | 108432205 A | * | 8/2018 | ........ H04L 63/0281 |
| DE | 102010013200 A1 | * | 9/2011 | ........... H04L 9/3215 |
| EP | 2065798 A1 | * | 6/2009 | ............ G06F 21/32 |
| EP | 3174241 A1 | * | 5/2017 | ........ H04L 63/0442 |
| EP | 3407309 A1 | * | 11/2018 | ........ G07C 9/00309 |
| EP | 3822832 A1 | * | 5/2021 | ............ G06F 21/32 |
| JP | 2003058509 A | * | 2/2003 | ............ G06F 21/32 |
| JP | 2006079213 A | * | 3/2006 | ............ H04L 63/08 |
| JP | 4884627 B2 | * | 2/2012 | ............ G06F 21/32 |
| JP | 2012049589 A | * | 3/2012 | ........ H04L 12/4625 |
| KR | 10-2015-0044067 A | | 4/2015 | |
| KR | 10-2017-0122980 A | | 11/2017 | |
| RU | 2681369 C1 | * | 3/2019 | ........ G06Q 30/0601 |
| TW | I724091 B | * | 4/2021 | |
| WO | WO-2012018158 A1 | * | 2/2012 | ............ H04L 9/321 |
| WO | WO-2016173993 A1 | * | 11/2016 | ........... H04L 9/0897 |
| WO | WO-2017027729 A2 | * | 2/2017 | ............ A61B 5/0205 |
| WO | WO-2017149537 A1 | * | 9/2017 | ....... G06F 17/30867 |
| WO | WO-2017214288 A1 | * | 12/2017 | ............ G06Q 20/00 |

OTHER PUBLICATIONS

International Search Report with Written Opinion dated Jun. 23, 2020; International Appln. No. PCT/KR2020/002679.

* cited by examiner

ELECTRONIC DEVICE AND METHOD FOR STORING USER IDENTIFICATION INFORMATION

CROSS-REFERENCE TO RELATED APPLICATION(S)

This application is based on and claims priority under 35 U.S.C. § 119(a) of a Korean patent application number 10-2019-0022418, filed on Feb. 26, 2019, in the Korean Intellectual Property Office, the disclosure of which is incorporated by reference herein in its entirety.

BACKGROUND

1. Field

The disclosure relates to an electronic device and a method for storing user identification information.

2. Description of Related Art

An identification card that may prove an individual's identity has been existed in a form of a plastic card on which individual's identification information (or identity information) was written. Recently, with a development of a security technology, an electronic identification (eID), in which the identification information is stored in a secure region of the plastic card, has been introduced. For example, the individual's identification information may be printed on a surface of the eID, and a chip that stores information that is the same as or similar to the printed information, or additional information may be embedded inside the eID. A user may use the eID to prove a user's identity both online and offline.

The above information is presented as background information only to assist with an understanding of the disclosure. No determination has been made, and no assertion is made, as to whether any of the above might be applicable as prior art with regard to the disclosure.

SUMMARY

A method for storing identification information of a user stored in an electronic identification (eID) in a mobile device such as a smartphone has been discussed. When the identification information is stored in the mobile device, the user may prove an identity thereof without having to carry a plastic card. When the user replaces the mobile device, the user may reissue the identification information on a new mobile device.

When the user stores the identification information in the mobile device, a relay attack may occur to expose the identification information of the user stored in a mobile device of a third party or identification information of the third party stored in the mobile device of the user.

Various embodiments disclosed in the disclosure may provide an electronic device and a method for securely storing the identification information of the user.

Aspects of the disclosure are to address at least the above-mentioned problems and/or disadvantages and to provide at least the advantages described below. Accordingly, an aspect of the disclosure is to provide an electronic device including at least one wireless communication circuit, a processor operatively connected with the at least one wireless communication circuit, and a memory operatively connected to the processor, wherein the memory stores instructions that, when executed, cause the processor to detect an event related to transmission of identification information through the at least one wireless communication circuit, in response to the detection of the event, perform a first authentication procedure for obtaining an access right to the identification information, relay a second authentication procedure between an external electronic device and a server through the at least one wireless communication circuit, and receive the identification information that is stored in the external electronic device from the server through the at least one wireless communication circuit.

Additional aspects will be set forth in part in the description which follows and, in part, will be apparent from the description, or may be learned by practice of the presented embodiments.

In accordance with an aspect of the disclosure, an electronic device is provided. The electronic device includes at least one wireless communication circuit, a secure element configured to store identification information, a processor operatively connected with the at least one wireless communication circuit, and a memory operatively connected to the processor, wherein the memory stores instructions that, when executed, cause the processor to detect an event related to transmission of the identification information through the at least one wireless communication circuit, in response to the detection of the event, perform an authentication procedure with a server through an external electronic device, transmit the identification information to the server through the at least one wireless communication circuit, and delete the identification information stored in the secure element.

In accordance with another aspect of the disclosure, a method of an electronic device is provided. The method includes detecting an event related to transmission of identification information, in response to the detection of the event, performing a first authentication procedure for obtaining an access right to the identification information, relaying a second authentication procedure between an external electronic device and a server, and receiving the identification information stored in the external electronic device from the server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
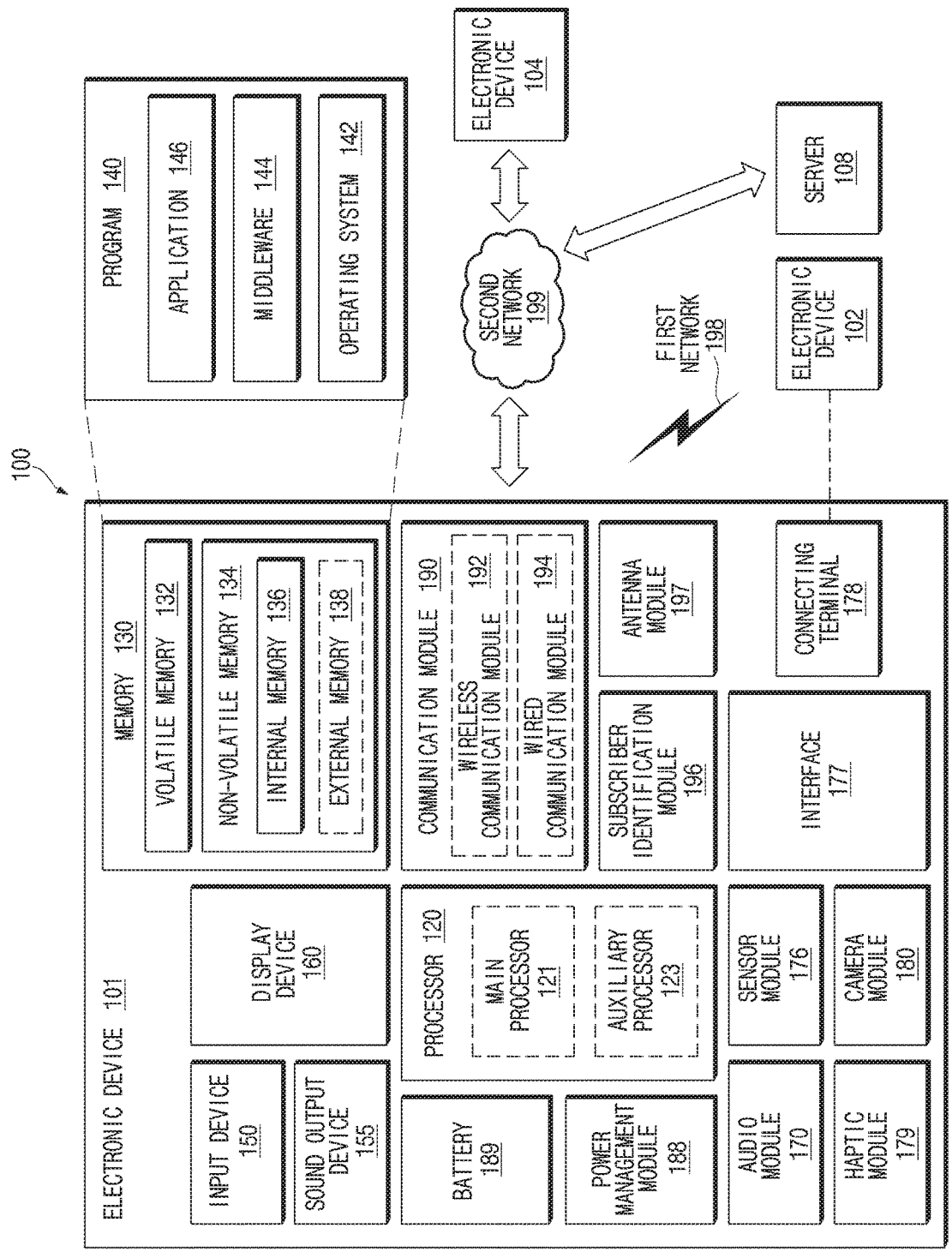
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
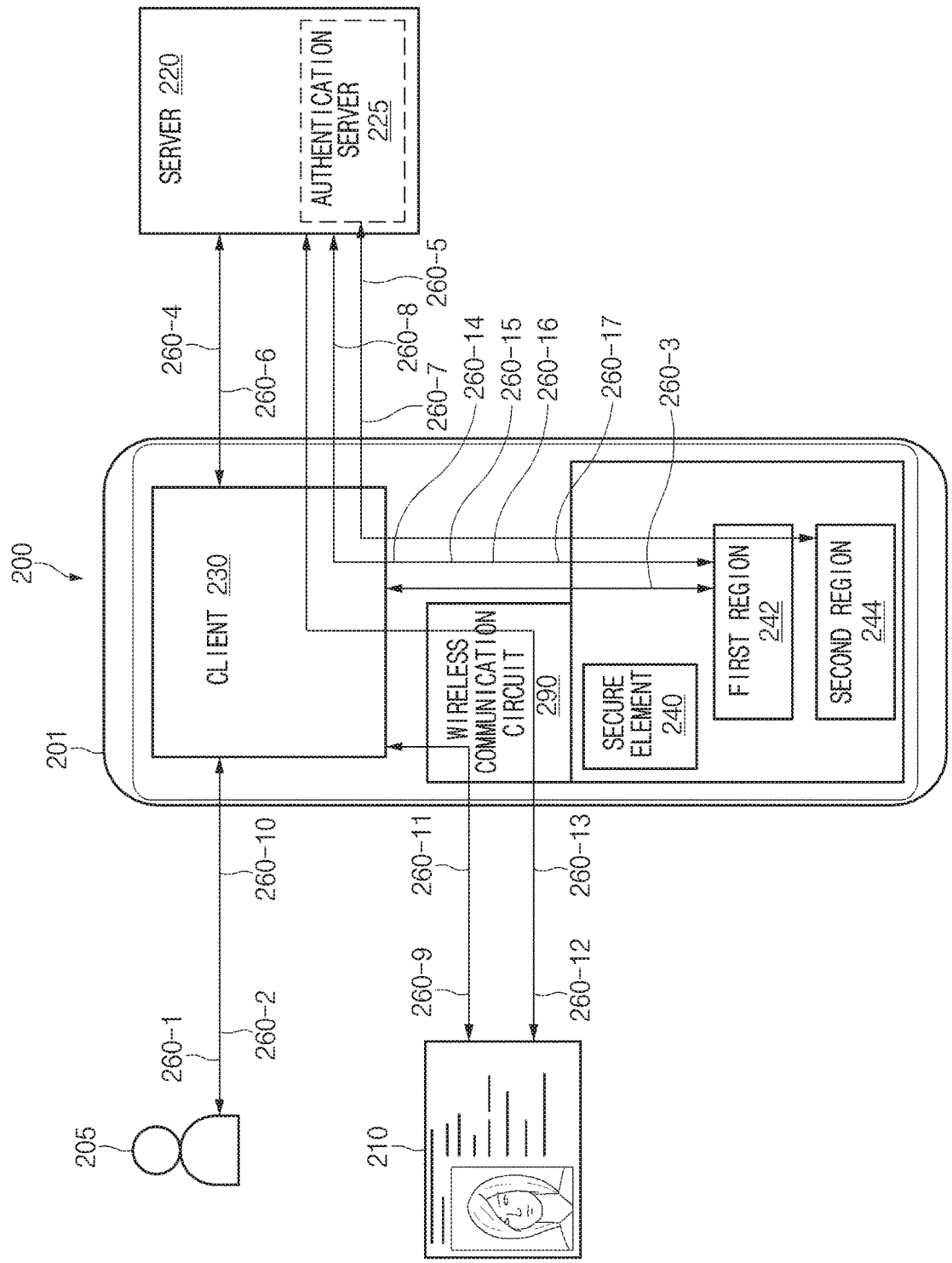
FIG. 2 illustrates an operating environment for storing identification information in an electronic device according to an embodiment of the disclosure.

FIG. 2 illustrates an operating environment for storing identification information in an electronic device 201 according to an embodiment of the disclosure.

Referring to FIG. 2, an operating environment 200 is illustrated. The electronic device 201 may perform an authentication procedure (or may be referred to as an authentication protocol) with a server 220 to store identification information of a user 205 stored in an electronic identification (eID) token 210 in a secure element 240 of the electronic device 201.

According to an embodiment, the eID token 210 may store the identification information (or identity information) for verifying an identity of the user 205. The eID token 210 may be referred to as an eID or an electronic identification card (eIC). The eID token 210 may be, for example, at least one of a passport, driver's license, and an identification card of another type (e.g., a certificate of residence or a citizen card) approved by a public institution. The eID token 210 may be graphically displayed similar to a plastic card. The identification information may include, for example, at least one of a photo containing a face of the user 205, a name of the user 205, a number for identifying the user 205, an issuing organization, a date of issue, and a signature of the user 205. The identification information may be stored in a secure chip. The secure chip may restrict external access to the identification information. For example, the electronic device 201 may need to perform the authentication procedure with the user 205 or with the server 220 to read or retrieve the identification information stored in the secure chip.

According to an embodiment, the server 220 (e.g., the server 108 of FIG. 1) may authenticate the eID token 210 and transmit the identification information stored in the eID token 210 to the electronic device 201. The server 220 may include an eID server. When the eID token 210 is issued by a government, the server 220 may be operated by an institution approved by the government.

According to an embodiment, an authentication server 225 may authenticate the electronic device 201 and the user 205. The authentication server 225 may support a fast identity online (FIDO). When the authentication server 225 supports FIDO, the electronic device 201 may perform local authentication for the user 205 using biometric information of the user 205, and perform device authentication for the electronic device 201 using a public key previously registered in the authentication server 225 and a FIDO-based authentication protocol. The user 205 may easily perform authentication thereof with only the electronic device 201 and the biometric information thereof through the FIDO-based authentication protocol. Although FIG. 2 illustrates an embodiment in which the authentication server 225 is included in the server 220, according to another embodiment, the authentication server 225 may be an entity separated from the server 220.

According to an embodiment, the electronic device 201 may perform a function the same as or similar to the electronic device 101 of FIG. 1. The electronic device 201 may be referred to as a user equipment or a terminal. The electronic device 201 may be a portable electronic device that may be carried by the user. The portable electronic device may include, for example, at least one of a smartphone, a tablet, and a wearable device.

According to an embodiment, the electronic device 201 may include a client 230, a wireless communication circuit 290, and the secure element 240. In addition to the components shown in FIG. 2, the electronic device 201 may further include at least one of the components included in the electronic device 101 of FIG. 1 (e.g., the processor 120, the display device 160, or the SIM 196).

According to an embodiment, the secure element 240 may be a space (or a region) included in a portion of the memory 130 of FIG. 1, or may be a separate chip physically separated from the memory 130. The secure element 240 may be referred to as an embedded secure element (eSE). The secure element 240 may perform a function the same as or similar to a function of the secure chip embedded in the eID token 210. The secure element 240 may include a first region 242 and a second region 244. The first region 242 and the second region 244 may be at least one of an applet and an application. The first region 242 may store the identification information of the user 205 transmitted from the eID token 210. The second region 244 may store the biometric information (or may be referred to as biometric authentication-related information) of the user 205 or an encryption key for the authentication procedure (e.g., FIDO protocol-based authentication procedure) with the authentication server 225.

According to an embodiment, the wireless communication circuit 290 may be at least a portion of the wireless communication module 192 of FIG. 1. The wireless communication circuit 290 may include at least one communication circuit that performs short-range wireless communication (e.g., the first network 198 of FIG. 1) and long-range wireless communication (e.g., the second network 199 of FIG. 1).

According to an embodiment, the client 230 may be a software module such as a program (e.g., the program 140 of FIG. 1), an application, or a set of instructions stored in the memory 130. For example, a processor (e.g., the processor 120 of FIG. 1) included in the electronic device 201 may perform a function of the client 230 by executing the instructions stored in the memory 130.

According to an embodiment, the client 230 may perform the local authentication for the user 205 by processing the user input received from the user 205. For example, the client 230 may perform the local authentication based on at least one of the biometric information or a personal information number (PIN) of the user.

Although FIG. 2 illustrates an embodiment in which the client 230 is connected to the server 220 or the authentication server 225, the client 230 may perform data communication with the server 220 or the authentication server 225 through a separate wireless communication circuit (e.g., the wireless communication circuit 290).

According to an embodiment, the client 230 may establish a first secure channel between the client 230 and the server 220. The first secure channel may include, for example, a transport layer security (TLS) channel that delivers encrypted data at a transport layer. The client 230 may exchange data for establishing a second secure channel with the server 220 through the first secure channel.

According to an embodiment, the client 230 may establish the second secure channel between the secure element 240 (e.g., the first region 242) and the server 220. The second secure channel may be based, for example, on a secure channel protocol of a global platform (GP). The client 230 may transmit the identification information of the user 205 obtained from the eID token 210 to the server 220 through the second secure channel, then receive the identification information of the user 205 from the server 220 through the second secure channel, and then store the received identification information in the first region 242.

According to an embodiment, the client 230 may perform short-range wireless communication with the eID token 210 through the wireless communication circuit 290. The short-range wireless communication may be at least one of, for example, near field communication (NFC), Bluetooth, Bluetooth low energy (BLE), ultra-wide band (UWB), Wi-Fi direct, and Zigbee. The eID token 210 may perform an authentication procedure for the eID token 210 with the server 220 through the client 230 connected through the short-range wireless communication.

An embodiment for storing the identification information of the user 205 stored in the eID token 210 in the electronic device 201 is as follows.

According to an embodiment, in operation 260-1, the client 230 may receive a user input requesting registration of the identification information. The registration of the identification information may indicate that the identification information of the user 205 stored in the eID token 210 is stored in the secure element 240. When an application (e.g., the application 146 of FIG. 1) or a web browser requires registration of a user account to store the identification information, the client 230 may receive the user input for requesting the registration of the user account through the application or the web browser.

According to an embodiment, in operation 260-2, the client 230 may perform identity authentication for the user 205. For example, the client 230 may identify that an owner of the eID token 210 and an owner of the electronic device 201 are the same person using at least one of a short message service (SMS) or a video call. As another example, the client 230 may perform the identity authentication using the biometric information of the user 205.

According to an embodiment, in operation 260-3, the client 230 may identify whether the identification information has already been registered in the secure element 240. For example, the client 230 may identify whether the identification information is stored in the first region 242.

According to an embodiment, when the identification information is not stored in the secure element 240, in operation 260-4, the client 230 may establish the first secure channel between the client 230 and the server 220.

According to an embodiment, in operation 260-5, the electronic device 101 may perform a FIDO-based registration protocol with the authentication server 225 through the second region 244 to simplify the authentication for using the identification information of the user 205 in the electronic device 101. For example, the second region 244 may generate a key pair (hereinafter, may be referred to as a 'first key pair'). When the biometric information of the user 205 is valid, the second region 244 may generate a digital signature value by signing a random value received from the authentication server 225 using a private key of the first key pair, and transmit the digital signature value including a public key of the first key pair to the authentication server 225. According to an embodiment, the second region 244 may transmit user verification information (UVI) indicating the biometric authentication-related information (e.g., a body part of the user used for the biometric authentication, such as a fingerprint, a face, an iris, or a vein), together with the digital signature value to the authentication server 225.

According to one embodiment, in operation 260-6, the client 230 may transmit a request message requesting establishment of the second secure channel between the first region 242 and the server 220 to the server 220. For example, the client 230 may transmit the request message through the first secure channel.

According to an embodiment, in operation 260-7, the second region 244 may perform the FIDO-based authentication protocol between the server 220 and the second region 244 to store the identification information of the user 205 in the secure element 240. For example, the second region 244 may transmit an identifier of the secure element 240 to the server 220. The identifier of the secure element 240 may include, for example, card production life cycle (CPLC) information. According to an embodiment, the second region 244 may transmit the digital signature value that may guarantee integrity of the identifier of the secure element 240 together with the identifier of the secure element 240 to the server 220. For example, the second region 244 may generate the digital signature value by signing the private key of the first key pair generated in operation 260-5 to the random value received from the authentication server 225.

When the FIDO-based authentication protocol is performed according to an embodiment, in operation 260-8, the client 230 may establish an end-to-end second secure channel between the first region 242 and the server 220 based on the identifier of the secure element 240. According to an embodiment, the client 230 may establish the second secure channel using a key (e.g., a symmetric key) shared between the first region 242 and the server 220.

According to an embodiment, in operation 260-9, the client 230 may detect that the eID token 210 is in physical contact with the electronic device 201 or located within a specified distance based on short-range wireless communication through the wireless communication circuit 290. The short-range wireless communication may be, for example, at least one of NFC, Bluetooth, BLE, UWB, Wi-Fi direct, and Zigbee.

In response to the detection of the eID token 210 according to an embodiment, in operation 260-10, the client 230 may perform a password-based authentication to obtain access right to the eID token 210. For example, the password-based authentication may be a password authenticated connection establishment (PACE) protocol defined in a Technical Report (TR)-03110 standard of the British Standards Institute (BSI). For example, the client 230 may receive a user input of inputting a password (e.g., PIN) from the user 205. In another example, the client 230 may receive a user input of inputting the biometric information for convenience of the user.

When the PACE protocol succeeds according to an embodiment, in operation 260-11, the client 230 may obtain the access right to the eID token 210.

In operation 260-12 according to an embodiment, the eID token 210 may perform the authentication protocol with the server 220 through the client 230. The authentication protocol may include, for example, an extended access control (EAC) protocol based on the BSI TR-03110 standard. The EAC protocol may include, for example, at least one of chip authentication (e.g., the secure chip mounted in the eID token 210) and terminal authentication (e.g., the eID token 210). The client 230 performs the short-range wireless communication with the eID token 210, and performs the long-range wireless communication with the server 220 to mediate an end-to-end authentication protocol between the eID token 210 and the server 220.

When the authentication protocol is performed between the eID token 210 and the server 220 according to an embodiment, in operation 260-13, the server 220 may read the identification information of the user 205 stored in the eID token 210.

According to an embodiment, the server 220 may identify that the owner of the eID token 210 and the owner of the electronic device 201 are the same person. When the owner of the eID token 210 and the owner of the electronic device 201 are the same person, in operation 260-14, the server 220 may transmit the identification information read from the eID token 210 to the first region 242 through the second secure channel.

According to an embodiment, in operation 260-15, the first region 242 may generate a key pair (hereinafter, may be referred to as a 'second key pair') for encrypting (or authenticating) the identification information, register a public key for the key pair in the server 220 through the second secure channel, and obtain a digital signature from the server 220.

According to an embodiment, in operation 260-16, the first region 242 may generate information related to revocation of the identification information and register the revocation-related information in the server 220 through the second secure channel.

According to another embodiment, in operation 260-17, the first region 242 may transmit the information related to the revocation of the identification information to a separate management server. The server 220 or the separate management server may revoke or manage the identification information based on the information related to the revocation of the identification information.

Figure 3:
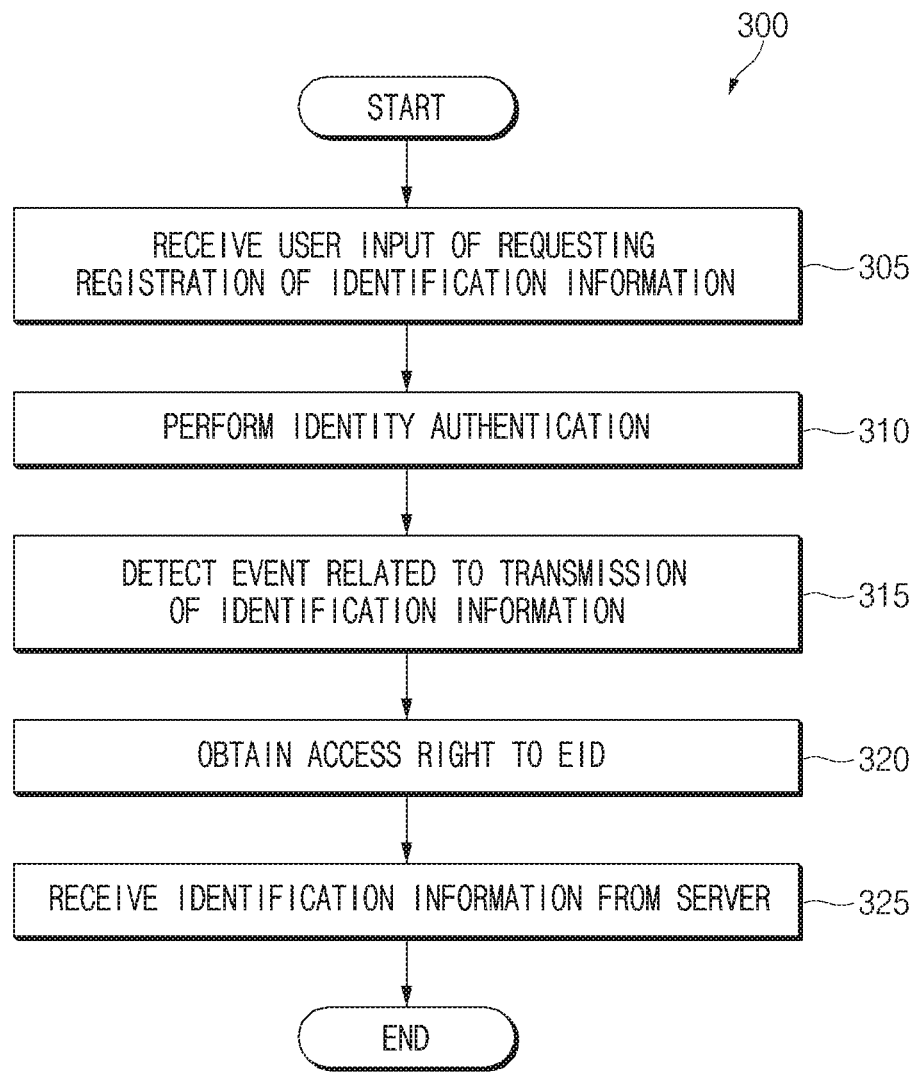
FIG. 3 shows a flowchart of operations of an electronic device for storing identification information according to an embodiment of the disclosure.

FIG. 3 shows a flowchart of operations of an electronic device for storing identification information according to an embodiment of the disclosure.

Referring FIG. 3, operations included in a flowchart 300 may be performed by the electronic device 201 or performed by a component of the electronic device 201 (e.g., the processor 120 of FIG. 1 or the client 230 of FIG. 2).

Referring to FIG. 3, in operation 305, the electronic device 201 may receive a user input of requesting registration of identification information. For example, the electronic device 201 may receive the user input of requesting the registration of the identification information through an application (e.g., the application 146 of FIG. 1) or a web browser.

In operation 310, the electronic device 201 may perform identity authentication for a user (e.g., the user 205 of FIG. 2). For example, the electronic device 201 may identify that an owner of an eID token (e.g., the eID token 210 of FIG. 2) and an owner of the electronic device 201 are the same person using at least one of a SMS or a video call. For another example, the electronic device 201 may perform the identity authentication based on biometric information of the user.

In operation 315, the electronic device 201 may detect an event related to transmission of the identification information. For example, the electronic device 201 may detect that the eID token is physically in contact with the electronic device 201 or located within a specified distance based on short-range wireless communication.

In operation 320, the electronic device 201 may obtain access right to the identification information stored in the eID token. For example, the electronic device 201 may receive a user input of inputting at least one of a password (e.g., the PIN) or the biometric information.

In operation 325, the electronic device 201 may receive the identification information of the user from a server (e.g., the server 220 of FIG. 2). According to an embodiment, the electronic device 201 may receive the identification information through a secure channel (e.g., the second secure channel of FIG. 2) established between the electronic device 201 and the server to protect the identification information from a risk of hacking or relay attack of a third party. One embodiment of establishing the secure channel will be described below in FIG. 4. According to an embodiment, the electronic device 201 may store the received identification information in a secure element (e.g., the secure element 240 of FIG. 2).

According to an embodiment, the electronic device 201 may relay an authentication protocol (e.g., the PACE protocol) between the eID token and the server before receiving the identification information of the user from the server. When the authentication protocol is completed, the electronic device 201 may transmit the identification information stored in the eID token to the server and receive the identification information from the server.

Although not shown in FIG. 3, the electronic device 201 may obtain a digital signature from the server such that the user may use the identification information. For example, the electronic device 201 may generate a second key pair for encrypting (or authenticating) the identification information, transmit a public key for the second key pair to the server, and obtain a digital signature (or authentication certificate) from the server.

Figure 4:
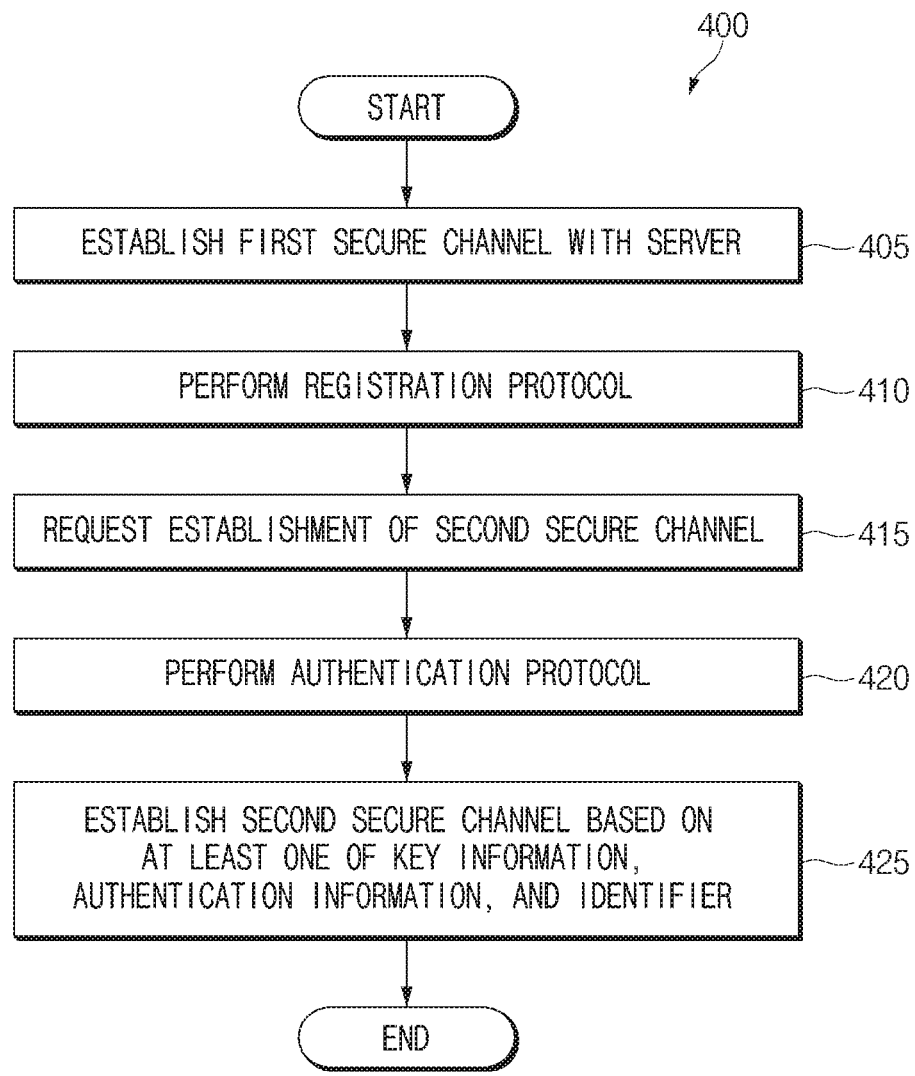
FIG. 4 shows a flowchart of operations of an electronic device for establishing a secure channel according to an embodiment of the disclosure.

FIG. 4 shows a flowchart of operations of an electronic device for establishing a secure channel according to an embodiment of the disclosure.

Referring FIG. 3, operations included in a flowchart 400 may be performed between operations 310 and 315 of FIG. 3. The operations included in the operational flowchart 400 may be performed by the electronic device 201 or performed by a component of the electronic device 201 (e.g., the processor 120 of FIG. 1 or the client 230 of FIG. 2).

Referring to FIG. 4, in operation 405, the electronic device 201 may establish a first secure channel (e.g., the first secure channel of FIG. 2) with a server (e.g., the server 220 of FIG. 2). The first secure channel may include, for example, a TLS channel.

In operation 410, the electronic device 201 may perform a registration protocol. The registration protocol may include a FIDO-based registration protocol. For example, the electronic device 201 may transmit a digital signature value including key information to the server. The key information may include a public key of a key pair (e.g., the first key pair of FIG. 2) generated by the electronic device 201. The digital signature value may indicate that biometric information of a user is valid. According to an embodiment, when an authentication server is a separate entity, the electronic device 201 may transmit the digital signature value to the authentication server.

In operation 415, the electronic device 201 may request the server to establish a second secure channel through the first secure channel.

In operation 420, the electronic device 201 may perform an authentication protocol. The authentication protocol may include a FIDO-based authentication protocol. For example, the electronic device 201 may transmit an identifier of a secure element (e.g., the secure element 240 of FIG. 2) to the server. The identifier of the secure element may include CPLC. According to an embodiment, the electronic device 201 may transmit a digital signature value that may guarantee integrity of the CPLC together with the CPLC. According to an embodiment, the digital signature value transmitted in operation 420 may be generated based on the key information generated in operation 410.

In operation 425, the electronic device 201 may establish the second secure channel (e.g., the second secure channel of FIG. 2) with the server based on at least one of the key information, the digital signature value, and the identifier of the secure element. The second secure channel may be based, for example, on a secure channel protocol of a GP.

FIGS. 5A, 5B, 5C, and 5D illustrate transmitting identification information from a first electronic device to a second electronic device according to various embodiments of the disclosure.

Referring to FIGS. 5A to 5D, an operation scenario 500 illustrates that the first electronic device 201 may correspond to the electronic device 201 of FIGS. 2 to 4. The second electronic device 501 may be a portable electronic device that performs a function the same as or similar to the function of the electronic device 201 of FIG. 2. FIGS. 5A to 5D may assume that an owner of the first electronic device 201 and an owner of the second electronic device 501 are the same person. For example, a user (e.g., the user 205 of FIG. 2) may replace a user terminal from the first electronic device 201 to the second electronic device 501.

Figure 5A:
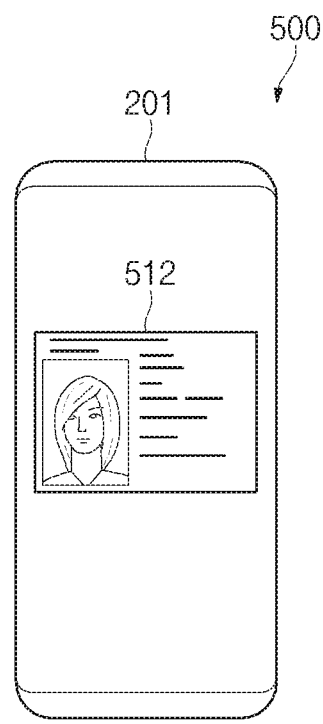
FIGS. 5A, 5B, 5C, and 5D illustrate transmitting identification information from a first electronic device to a second electronic device according to various embodiments of the disclosure.

Referring to FIG. 5A, the first electronic device 201 may store identification information of the user based on the embodiment of FIGS. 2 to 4. For example, the first electronic device 201 may store the identification information in a secure element (e.g., the secure element 240 or the first region 242 of FIG. 2). According to an embodiment, the first electronic device 201 may display a first graphical user interface (GUI) 512 indicating the identification information through a display (e.g., the display device 160 of FIG. 1). For example, the first GUI 512 may represent a form the same as or at least partially different from an eID (e.g., the eID token 210 of FIG. 2).

Figure 5B:
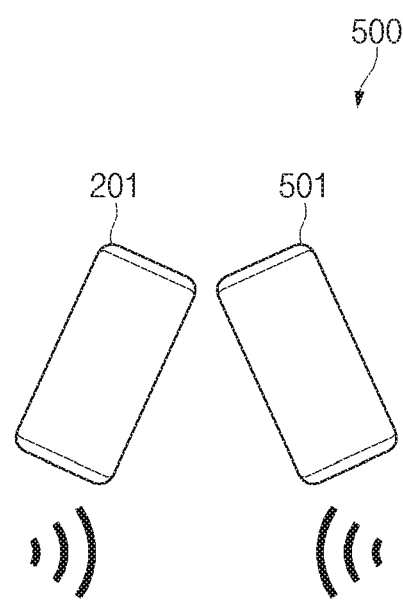

Referring to FIG. 5B, the first electronic device 201 and the second electronic device 501 may detect an event related to transmission of the identification information through short-range wireless communication. For example, the first electronic device 201 and the second electronic device 501 may detect that another electronic device is in physical contact therewith or within a specified distance therefrom based on at least one of NFC, Bluetooth, BLE, UWB, Wi-Fi direct, and Zigbee.

Figure 5C:
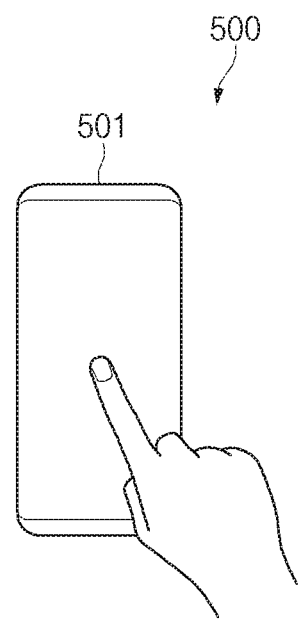

When the event related to the transmission of the identification information is detected, referring to FIG. 5C, the second electronic device 501 may perform user authentication to obtain the identification information stored in the first electronic device 201. According to an embodiment, the second electronic device 501 may authenticate using a PACE protocol. For example, the second electronic device 501 may receive a user input of inputting at least one of a password (e.g., the PIN) or biometric information from the user.

Figure 5D:
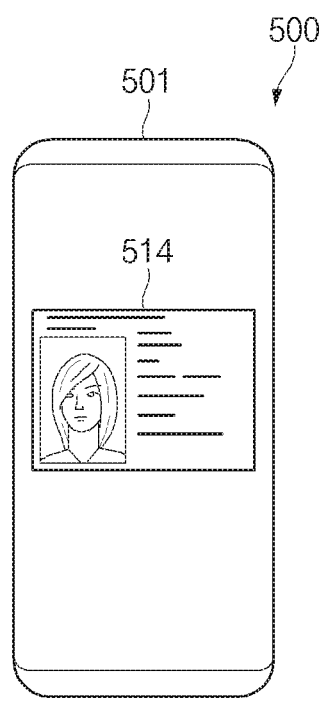

When the user authentication is performed, referring to FIG. 5D, the second electronic device 501 may receive the identification information of the user from the first electronic device 201 through a server (e.g., the server 220 of FIG. 2). According to an embodiment, the second electronic device 501 may display a second GUI 514 indicating the identification information. For example, the second GUI 514 may have the same form as the first GUI 512.

In a case of card information related to a credit card, because the first electronic device 201 stores tokenized information, the card information may not be able to move from the first electronic device 201 to the second electronic device 501. On the other hand, because the identification information of the user is stored in the first electronic device 201, the second electronic device 501 may store the identification information of the user stored in the first electronic device 201 in the second electronic device 501 through short-range wireless communication and the user authentication.

Figure 6:
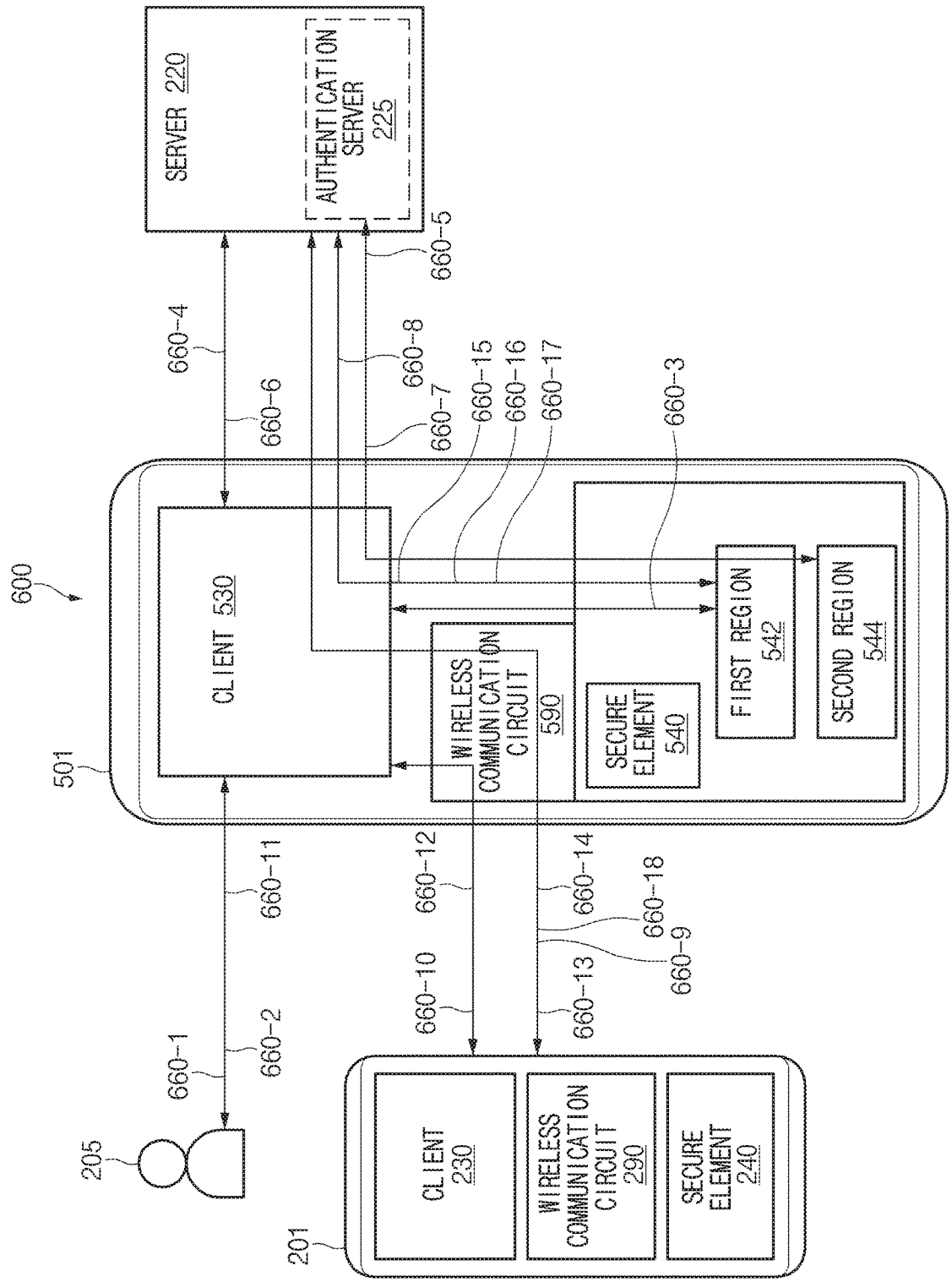
FIG. 6 illustrates transmitting identification information from a first electronic device to a second electronic device according to an embodiment of the disclosure.

FIG. 6 illustrates transmitting identification information from a first electronic device to a second electronic device according to an embodiment of the disclosure.

Referring to FIG. 6, an operating environment 600 illustrates that the second electronic device 501 may perform an authentication procedure with the server 220, and store the identification information of the user 205 stored in the secure element 240 of the first electronic device 201 in a secure element 540 of the second electronic device 501 through the server 220 to protect the identification information from the hacking or the relay attack from the third party.

According to an embodiment, the second electronic device 501 may include a client 530, a wireless communication circuit 590, and the secure element 540. In addition to the components illustrated in FIG. 6, the second electronic device 501 may further include at least one of components included in the electronic device 101 of FIG. 1 (e.g., the processor 120, the display device 160, or the SIM 196). The client 530, the wireless communication circuit 590, the secure element 540, a first region 542, and a second region 544 perform the same or similar functions of the components of the electronic device 201 having the same names shown in FIG. 2, so that redundant descriptions thereof may be omitted below.

According to an embodiment, the client 530 of the second electronic device 501 may establish a first secure channel or a second secure channel Since the first secure channel and the second secure channel perform the same or similar functions as the secure channels having the same names shown in FIG. 2, redundant descriptions thereof may be omitted below.

According to an embodiment, the client 530 may perform short-range communication with the wireless communication circuit 290 of the first electronic device 201 through the wireless communication circuit 590. The short-range wireless communication may be, for example, at least one of NFC, Bluetooth, BLE, UWB, Wi-Fi direct, and Zigbee. The secure element 240 (e.g., the first region 242 of FIG. 2) of the first electronic device 201 may perform an authentication procedure with the server 220 through the client 530 connected through the short-range wireless communication.

An embodiment for storing the identification information of the user 205 stored in the first electronic device 201 in the second electronic device 501 is described below.

According to an embodiment, in operation 660-1, the client 530 may receive a user input of requesting registration (or storage) of the identification information. When an application or a web browser requires registration of a user account to store the identification information, the client 530 may receive the user input of requesting the registration of the user account through the application or the web browser.

According to an embodiment, in operation 660-2, the client 530 may perform identity authentication for the user 205. For example, the client 530 may identify that the owner of the first electronic device 201 and the owner of the second electronic device 501 are the same person using at least one of an SMS and a video call. As another example, the client 530 may perform the identity authentication using the biometric information of the user 205.

According to an embodiment, in operation 660-3, the client 530 may identify whether the identification information has been registered in the secure element 540. For example, the client 530 may identify whether the identification information is stored in the first region 542.

According to an embodiment, when the identification information is not stored in the secure element 540, in operation 660-4, the client 530 may establish a first secure channel between the client 530 and the server 220.

According to an embodiment, in operation 660-5, the second electronic device 501 may perform a FIDO-based registration protocol with the authentication server 225 through the second region 544 to simplify authentication for using the identification information of the user 205 in the electronic device 101. For example, the second region 544 may generate a key pair (e.g., a key pair of the same type as the first key pair of FIG. 2). When the biometric information of the user 205 is valid, the second region 544 may generate a digital signature value by signing a random value received from the authentication server 225 using a private key of the key pair, and transmit the digital signature value including a public key (e.g., a public key of the same type as the public key of FIG. 2) of the key pair to the authentication server 225. According to an embodiment, the second region 544 may transmit a UVI indicating information related to biometric authentication to the authentication server 225 together with the digital signature value.

According to an embodiment, in operation 660-6, the client 530 may transmit a request message requesting establishment of a second secure channel between the first region 542 and the server 220 to the server 220. For example, the client 530 may transmit the request message through the first secure channel.

According to an embodiment, in operation 660-7, the second region 544 may perform a FIDO-based authentication protocol between the server 220 and the second region 544 to store the identification information of user 205 in the secure element 540. For example, the second region 544 may transmit an identifier of the secure element 540 to the server 220. The identifier of the secure element 540 may include CPLC information, for example. According to an embodiment, the second region 544 may transmit a digital signature value that may guarantee the integrity of the identifier of the secure element 240 to the server 220 together with the identifier of the secure element 540. For example, the second region 544 may generate the digital signature value by signing the private key of the key pair generated in operation 660-5 to the random value received from the authentication server 225.

When the FIDO-based authentication protocol is performed according to an embodiment, in operation 660-8, the client 530 may establish an end-to-end second secure channel between the first region 542 and the server 220 based on the identifier of the secure element 540. According to an embodiment, the client 530 may establish the second secure channel using a key (e.g., a symmetric key) shared between the first region 542 and the server 220 in addition to the CPLC.

According to an embodiment, in operation 660-9, the first electronic device 201 (e.g., the client 230) may perform user authentication to move the identification information from the first electronic device 201 to the second electronic device 501. For example, the first electronic device 201 may perform the user authentication by performing the FIDO-based authentication protocol with the authentication server 225.

According to an embodiment, in operation 660-10, the client 530 may detect, through the wireless communication circuit 590, that the first electronic device 201 is in physical contact with the second electronic device 501 or located within a specified distance (e.g., in FIG. 5B). For example, the client 530 may detect that the first electronic device 201 is in physical contact with the second electronic device 501 or located within the specified distance based on the short-range wireless communication.

According to an embodiment, in response to the detecting of the first electronic device 201, in operation 660-11, the client 530 may perform a PACE protocol to obtain access right to the identification information stored in the secure element 240 (e.g., FIG. 5C). For example, the client 530 may receive a user input of inputting a password (e.g., the PIN) from the user 205. For another example, the client 530 may receive a user input of inputting biometric information for convenience of the user.

According to an embodiment, when the PACE protocol succeeds, in operation 660-12, the client 530 may obtain the access right to the identification information stored in the secure element 240.

In operation 660-13 according to an embodiment, the secure element 240 of the first electronic device 201 (e.g., the first region 242 of FIG. 2) may perform an authentication protocol with the server 220 through the second electronic device 501. The authentication protocol may include, for example, an EAC protocol. The EAC protocol may include, for example, at least one of chip authentication (e.g., authentication of the secure element 240) or terminal authentication (e.g., authentication of the first electronic device 201). The client 530 may perform short-range wireless communication with the first electronic device 201 and perform long-range wireless communication with the server 220 to mediate an end-to-end authentication protocol between the first electronic device 201 and the server 220.

According to an embodiment, when the authentication protocol between the secure element 240 of the first electronic device 201 and the server 220 is performed, in operation 660-14, the server 220 may read the identification information of the user 205 stored in the secure element 240.

According to an embodiment, the server 220 may identify that the owner of the first electronic device 201 and the owner of the second electronic device 501 are the same person. When the owner of the first electronic device 201 and the owner of the second electronic device 501 are the same person, the server 220 may transmit the identification information read from the secure element 240 of the first electronic device 201 to the first region 542 of the second electronic device 501 through the second secure channel.

According to an embodiment, in operation 660-15, the first region 542 may generate a key pair (e.g., a key pair of the same type as the second key pair of FIG. 2) for encrypting (or authenticating) the identification information, register a public key for the key pair in the server 220 through the second secure channel, and obtain a digital signature (or an authentication certificate) from the server 220.

According to an embodiment, in operation 660-16, the first region 542 may generate information related to revocation of the identification information and register the information related to the revocation of the identification information in the server 220 through the second secure channel.

According to another embodiment, in operation 660-17, the first region 542 may transmit the information related to the revocation of the identification information to a separate management server. The server 220 or the separate management server may revoke or manage the identification information based on the information related to the revocation of the identification information.

According to an embodiment, in operation 660-18, the client 230 of the first electronic device 201 may revoke the identification information of the user 205 stored in the secure element 240. For example, the first electronic device 201 may delete the identification information stored in the secure element 240 in response to a request of the client 530 of the second electronic device 501 or the server 220.

Figure 7:
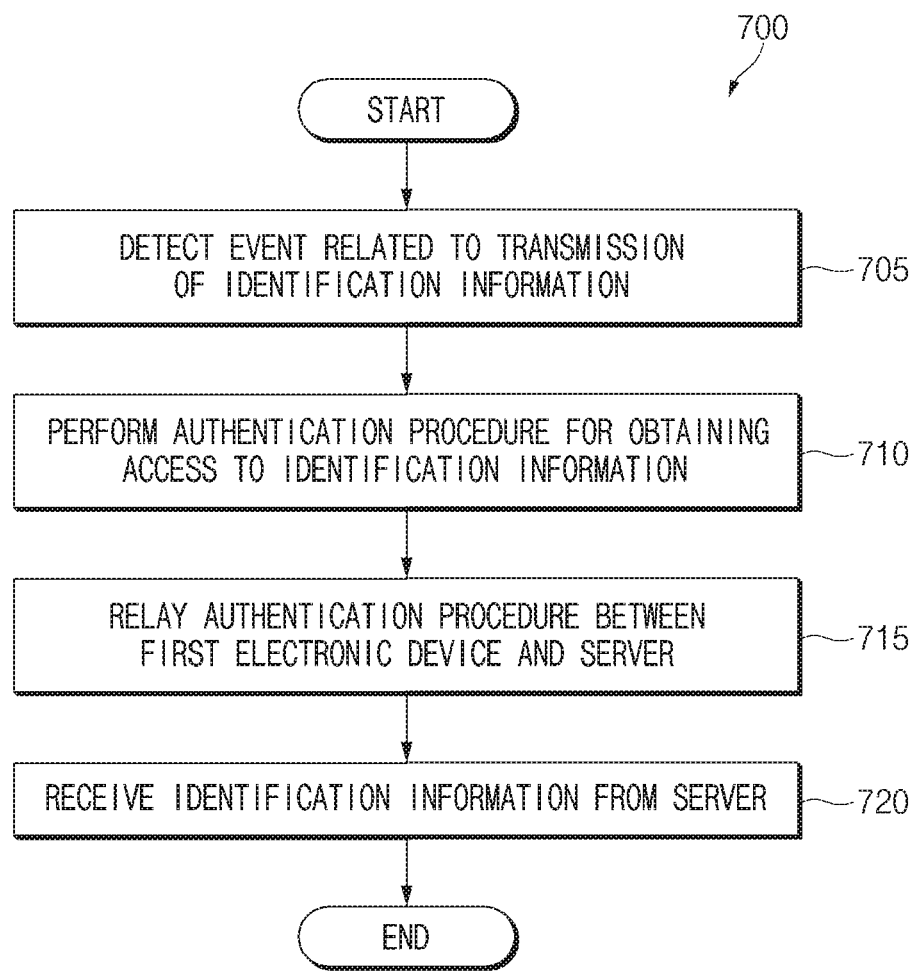
FIG. 7 illustrates a flowchart for transmitting identification information from a first electronic device to a second electronic device according to an embodiment of the disclosure.

FIG. 7 illustrates a flowchart for transmitting identification information from a first electronic device 201 to a second electronic device according to an embodiment of the disclosure.

Referring to FIG. 7, the operations included in a flowchart 700 may be performed by the second electronic device 501 or may be performed by a component of the electronic device 501 (e.g., the processor 120 of FIG. 1 or the client 530 of FIG. 6).

Referring to FIG. 7, in operation 705, the second electronic device 501 may detect an event related to transmission of the identification information. For example, the second electronic device 501 may detect that the first electronic device 201 is in physical contact with or located within a specified distance from the second electronic device 501 based on short-range wireless communication.

According to an embodiment, the second electronic device 501 may perform identity authentication for the transmission of the identification information before performing operation 705. For example, the second electronic device 501 may receive a user input of requesting registration of the identification information, and perform the identity authentication for a user (e.g., the user 205 of FIG. 6) in response to the received user input. According to an embodiment, the second electronic device 501 performs the identity authentication using at least one of a SMS, a video call, and biometric information to identity that the owner of the first electronic device 201 and the owner of the second electronic device 501 are the same person.

In operation 710, the second electronic device 501 may perform an authentication procedure for obtaining access right to the identification information stored in the first electronic device. According to an embodiment, the authentication procedure for obtaining the access right may be based on a PACE protocol. For example, the second electronic device 501 may receive a user input of inputting at least one of a password (e.g., the PIN) and the biometric information. The second electronic device 501 may obtain the access right to the identification information stored in the first electronic device 201 based on at least one of the input password or biometric information.

In operation 715, the second electronic device 501 may relay an authentication procedure between the first electronic device 201 and a server. For example, the second electronic device 501 may be connected with the first electronic device 201 through short-range wireless communication, and the second electronic device 501 may be connected with the server through long-range wireless communication. The server may read the identification information stored in the first electronic device 201 through the second electronic device 501. According to an embodiment, the authentication procedure between the first electronic device 201 and the server may be based on an EAC protocol.

In operation 720, the second electronic device 501 may receive the identification information of the user from the server (e.g., the server 220 of FIG. 6). The second electronic device 501 may receive the identification information through a secure channel (e.g., the second secure channel of FIG. 6) established between the second electronic device 501 and the server to protect the identification information from the risk of hacking or relay attack of the third party. According to an embodiment, the second electronic device 501 may store the received identification information in a secure element (e.g., the secure element 540 of FIG. 6).

According to an embodiment, the second electronic device 501 may relay an authentication protocol (e.g., the PACE protocol) between the first electronic device 201 and the server before receiving the identification information of the user from the server. When the authentication protocol is completed, the second electronic device 501 may transmit the identification information stored in the first electronic device 201 to the server and receive the identification information from the server.

According to an embodiment, the second electronic device 501 may transmit a message requesting revocation (or deletion) of the identification information stored in the first electronic device 201 after storing the identification information. For example, the second electronic device 501 may transmit the message to the first electronic device 201 or the server.

One embodiment of establishing a secure channel may refer to the operational flowchart 400 of FIG. 4. According to an embodiment, the second electronic device 501 may establish a first secure channel (e.g., the first secure channel of FIG. 6) with the server. After the first secure channel is established, the second electronic device 501 may perform a registration protocol with the server or a separate authentication server (e.g., the authentication server 225 of FIG. 6) separated from the server. For example, the second electronic device 501 may generate a key pair (e.g., a key pair of the same type as the first key pair of FIG. 2) and transmit a digital signature value to the server together with a public key of the key pair. After the registration protocol is performed, the second electronic device 501 may request the server to establish a second secure channel (e.g., the second secure channel of FIG. 6) through the first secure channel. The second electronic device 501 may perform an authentication protocol to establish the second secure channel. For example, the second electronic device 501 may transmit an identifier of a secure element (e.g., the secure element 540 of FIG. 6) to the server. As another example, the second electronic device 501 may transmit a digital signature value that may guarantee integrity of the identifier together with the identifier.

Although not shown in FIG. 7, the second electronic device 501 may obtain the digital signature from the server such that the user may use the identification information. For example, the second electronic device 501 may generate a key pair (e.g., a key pair of the same type as the second key pair of FIG. 2) for encrypting (or authenticating) the identification information, transmit a public key of the key pair to the server, and obtain a digital signature (or authentication certificate) from the server.

Figure 8:
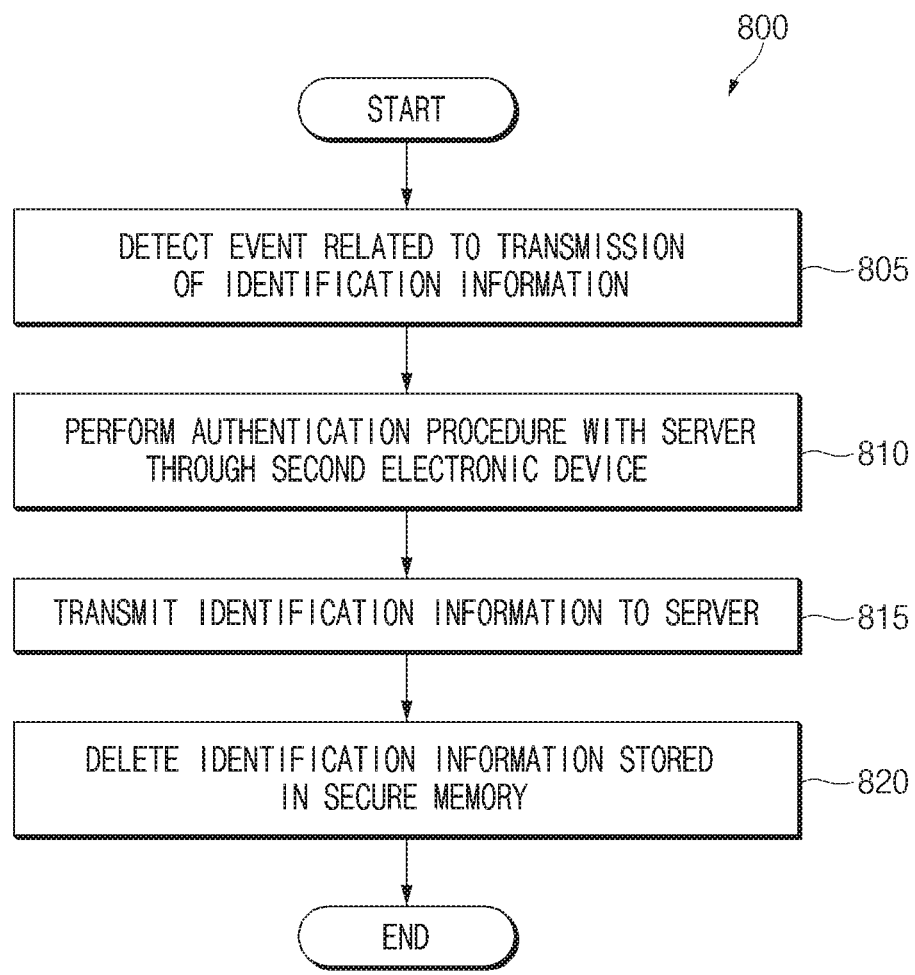
FIG. 8 illustrates a flowchart for transmitting identification information from a first electronic device to a second electronic device according to an embodiment of the disclosure.

FIG. 8 illustrates a flowchart for transmitting identification information from a first electronic device to a second electronic device according to an embodiment of the disclosure.

Referring to FIG. 8, the operations included in a flowchart 800 may be performed by the first electronic device 201 or may be performed by a component of the electronic device 201 (e.g., the processor 120 of FIG. 1 or the client 230 of FIG. 6).

Referring to FIG. 8, in operation 805, the first electronic device 201 may detect an event related to transmission of the identification information. For example, the first electronic device 201 may detect that the second electronic device 501 is in physical contact with or located within a specified distance from the first electronic device 201 based on short-range wireless communication.

According to an embodiment, the first electronic device 201 may perform user authentication to move the identification information before performing operation 805. For example, the first electronic device 201 may perform the user authentication by performing a FIDO-based authentication protocol. The first electronic device 201 may receive a user input of biometric information from a user (e.g., the user 205 of FIG. 6), and transmit a digital signature value including a pre-registered public key and ensuring validity of the biometric information to an authentication server (e.g., the authentication server 225 of FIG. 6) to perform the FIDO-based authentication protocol.

In response to the detection of the event, in operation 810, the first electronic device 201 may perform an authentication procedure with a server (e.g., the server 220 of FIG. 6) through the second electronic device 501. For example, the first electronic device 201 may be connected with the second electronic device 501 through short-range wireless communication, and may perform the authentication procedure with the server through long-range wireless communication between the second electronic device 501 and the server. According to an embodiment, the authentication procedure between the first electronic device 201 and the server may be based on an EAC protocol.

In operation 815, the first electronic device 201 may transmit the identification information to the server. According to an embodiment, in a state of being in short-range wireless communication with the second electronic device 501, the first electronic device 201 may transmit the identification information to the server using the short-range wireless communication of the second electronic device 501. According to an embodiment, the first electronic device 201 may transmit the identification information after performing an authentication protocol with the server. For example, the authentication protocol may include an EAC protocol.

In operation 820, the first electronic device 201 may delete the identification information stored in a secure element (e.g., the secure element 240 of FIG. 6). For example, the first electronic device 201 may delete the identification information in response to a request of the second electronic device 501 or the server.

As described above, an electronic device (e.g., the second electronic device 501 of FIG. 6) may include at least one wireless communication circuit (e.g., the first electronic device 201 of FIG. 6) for communicating with an external electronic device (e.g., 201 of FIG. 6) or a server (server 220 of FIG. 6), a processor (the processor 120 of FIG. 1) operatively connected with the at least one wireless communication circuit, and a memory (e.g., the memory 130 of FIG. 1) operatively connected to the processor, wherein the memory may store instructions that, when executed, cause the processor to detect an event related to transmission of identification information through the at least one wireless communication circuit, perform a first authentication procedure for obtaining access right to the identification information in response to the detection of the event, relay a second authentication procedure between the external electronic device and the server through the at least one wireless communication circuit, and receive the identification information stored in the external electronic device from the server through the at least one wireless communication circuit.

According to an embodiment, the at least one wireless communication circuit may support short-range wireless communication, and wherein the instructions may cause the processor to detect that the external electronic device is located within a specified distance from the electronic device based on the short-range wireless communication, and detect the event when the external electronic device is located within the specified distance from the electronic device.

According to an embodiment, the instructions may cause the processor to receive a user input of inputting at least one of a PIN and biometric information, and obtain the access right to the identification information based on at least one of the PIN and the biometric information.

According to an embodiment, the electronic device may further include a secure element for storing the identification information, and wherein the instructions may cause the processor to establish a first secure channel between the memory and the server through the at least one wireless communication circuit. transmit at least one of first key information and authentication information to the server, request the server to establish a second secure channel for transmitting the identification information through the first secure channel, transmit an identifier of the secure element to the server, establish the second secure channel between the secure element and the server based on at least one of the first key information, the authentication information, and the identifier of the secure element, and receive the identification information stored in the external electronic device from the server through the second secure channel.

According to an embodiment, the first secure channel may include a TLS channel that delivers encrypted data in a transport layer, and the second secure channel may be based on a secure channel protocol of a GP.

According to an embodiment, the instructions may cause the processor to generate second key information for encrypting the identification information, transmit the second key information to the server through the at least one wireless communication circuit, and obtain a digital signature based on the second key information from the server.

According to an embodiment, the instructions may cause the processor to transmit a message requesting deletion of the identification information stored in the external electronic device to the server or the external electronic device through the at least one wireless communication circuit.

According to an embodiment, the electronic device may further include a display, and the instructions may cause the processor to display, through the display, a GUI indicating the identification information.

As described above, an electronic device (e.g., the first electronic device 201 of FIG. 6) may include at least one wireless communication circuit (e.g., wireless communication circuit 290 of FIG. 6) for communicating with an external electronic device (e.g., the second electronic device 501 of FIG. 6) or a server (e.g., server 220 of FIG. 6), a secure element (e.g., the secure element 240 of FIG. 6) for storing identification information, a processor (e.g., the processor 120 of FIG. 1) operatively connected with the at least one wireless communication circuit, and a memory (e.g., the memory 130 of FIG. 1) operatively connected to the processor, wherein the memory may store instructions that, when executed, cause the processor to detect an event related to transmission of the identification information through the at least one wireless communication circuit, perform an authentication procedure with the server through the external electronic device in response to the detection of the event, transmit the identification information to the server through the at least one wireless communication circuit, and delete the identification information stored in the secure element.

According to an embodiment, the at least one wireless communication circuit may support short-range wireless communication, and the instructions may cause the processor to perform user authentication to move the identification information before the detection of the event.

According to an embodiment, the instructions may cause the processor to, while performing the user authentication, generate key information or receiving a user input of inputting biometric information, and transmit at least one of the key information and the biometric information to the server through the at least one wireless communication circuit.

According to an embodiment, the instructions may cause the processor to be connected to the external electronic device through the at least one wireless communication circuit, and perform the authentication procedure with the server through long-range wireless communication supported by the external electronic device.

According to an embodiment, the instructions may cause the processor to perform the authentication procedure based on an EAC protocol defined in a TR-03110 Standard Specification of the BSI.

According to an embodiment, the instructions may cause the processor to receive a message requesting deletion of the identification information stored in the secure element from the external electronic device or the server through the at least one wireless communication circuit, and delete the identification information in response to the reception of the message.

As described above, a method of an electronic device may include detecting an event related to transmission of identification information, performing a first authentication procedure for obtaining access right to the identification information in response to the detection of the event, relaying a second authentication procedure between the external electronic device and the server, and receiving the identification information stored in the external electronic device from the server.

According to an embodiment, the detecting of the event may include detecting that the external electronic device is located within a specified distance from the electronic device based on short-range wireless communication, and detecting the event when the external electronic device is located within the specified distance from the electronic device.

According to an embodiment, the performing of the first authentication procedure may include receiving a user input of inputting at least one of a PIN and biometric information, and obtaining the access right to the identification information based on at least one of the PIN and the biometric information.

According to an embodiment, the method may further include establishing a first secure channel with the server, transmitting at least one of first key information and authentication information to the server, requesting the server to establish a second secure channel for transmitting the identification information through the first secure channel, transmitting an identifier of a secure element to the server, and establishing the second secure channel with the server based on at least one of the first key information, the authentication information, and the identifier of the secure element, and the receiving of the identification information from the server may include receiving the identification information through the second secure channel.

According to an embodiment, the method may further include generating second key information for encrypting the identification information in response to the reception of the identification information, transmitting the second key information to the server, and obtaining a digital signature based on the second key information from the server.

According to an embodiment, the method may further include transmitting a message requesting deletion of the identification information stored in the external electronic device to the server or the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may securely receive and store the identification information stored in the eID to provide an environment in which the user may prove the identity thereof without having to carry the plastic card.

According to embodiments disclosed in the disclosure, the electronic device may provide a method for easily storing the identification information in the new electronic device.

In addition, various effects that are identified directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one wireless communication circuit;
a secure element;
a processor operatively connected with the at least one wireless communication circuit; and
a memory operatively connected to the processor, wherein the memory stores instructions that, when executed, cause the processor to:
establish a first secure channel between the memory and a server through the at least one wireless communication circuit;
transmit at least one of first key information or biometric authentication-related information to the server;
request the server to establish a second secure channel through the first secure channel;
transmit an identifier of the secure element to the server;
establish the second secure channel between the secure element and the server based on at least one of the first key information, the biometric authentication-related information, or the identifier;
detect an event related to transmission of identification information through the at least one wireless communication circuit;
in response to the detection of the event, perform a first authentication procedure for obtaining an access right to the identification information;
relay a second authentication procedure between an external electronic device and the server through the at least one wireless communication circuit, wherein the second authentication procedure is an authentication procedure in which the server read the identification information stored in the external electronic device and identifies that an owner of the external electronic device and the owner of the electronic device are the same person;
receive the identification information that is stored in the external electronic device from the server through the second secure channel; and
store the received identification information in the secure element,
wherein the first secure channel includes a transport layer security (TLS) channel configured to deliver encrypted data in a transport layer, and
wherein the second secure channel is based on a secure channel protocol of a global platform (GP).

2. The electronic device of claim 1,
wherein the at least one wireless communication circuit is configured to support short-range wireless communication, and
wherein the instructions further cause the processor to:
determine whether the external electronic device is located within a specified distance from the electronic device based on the short-range wireless communication, and
detect the event based on the external electronic device being located within the specified distance from the electronic device.

3. The electronic device of claim 1, wherein the instructions further cause the processor to:
receive a user input at least one of a personal information number (PIN) or biometric information; and
obtain the access right to the identification information based on at least one of the PIN or the biometric information.

4. The electronic device of claim 1, wherein the instructions further cause the processor to:
    generate second key information for encrypting the identification information;
    transmit the second key information to the server through the at least one wireless communication circuit; and
    obtain a digital signature based on the second key information from the server.

5. The electronic device of claim 1, wherein the instructions further cause the processor to:
    transmit a message requesting deletion of the identification information stored in the external electronic device to the server or the external electronic device through the at least one wireless communication circuit.

6. The electronic device of claim 1, further comprising:
    a display,
    wherein the instructions further cause the processor to:
        display, through the display, a graphical user interface (GUI) including the identification information.

7. A method of an electronic device, the method comprising:
    establishing a first secure channel between the electronic device and a server;
    transmitting at least one of first key information or biometric authentication-related information to the server;
    requesting the server to establish a second secure channel through the first secure channel;
    transmitting an identifier of a secure element to the server;
    establishing the second secure channel between the secure element and the server based on at least one of the first key information, biometric authentication-related information, or the identifier;
    detecting an event related to transmission of identification information;
    in response to the detection of the event, performing a first authentication procedure for obtaining an access right to the identification information;
    relaying a second authentication procedure between an external electronic device and the server, wherein the second authentication procedure is an authentication procedure in which the server read the identification information stored in the external electronic device and identifies that an owner of the external electronic device and the owner of the electronic device are the same person;
    receiving the identification information stored in the external electronic device from the server through the second secure channel; and
    storing the received identification information in the secure element,
    wherein the first secure channel includes a transport layer security (TLS) channel configured to deliver encrypted data in a transport layer, and
    wherein the second secure channel is based on a secure channel protocol of a global platform (GP).

8. The method of claim 7, wherein the detecting of the event includes:
    determining whether the external electronic device is located within a specified distance from the electronic device based on short-range wireless communication; and
    detecting the event when the external electronic device is located within the specified distance from the electronic device.

9. The method of claim 7, wherein the performing of the first authentication procedure includes:
    receiving a user input at least one of a personal information number (PIN) or biometric information; and
    obtaining the access right to the identification information based on at least one of the PIN or the biometric information.

10. The method of claim 7, further comprising:
    in response to the reception of the identification information, generating second key information for encrypting the identification information;
    transmitting the second key information to the server; and
    obtaining a digital signature based on the second key information from the server.

11. The method of claim 7, further comprising:
    transmitting a message requesting deletion of the identification information stored in the external electronic device to the server or the external electronic device.

* * * * *